United States Patent
Linkner, Jr. et al.

(10) Patent No.: US 6,498,558 B1
(45) Date of Patent: Dec. 24, 2002

(54) SOLENOID VALVE COIL HAVING AN INTEGRATED BOBBIN AND FLUX RING ASSEMBLY

(75) Inventors: Herbert L. Linkner, Jr., Dexter, MI (US); Robert Anderson, Solihul (GB)

(73) Assignee: Kelsey-Hayes Company, Livonia, MI (US)

(*) Notice: Subject to any disclaimer, the term of this patent is extended or adjusted under 35 U.S.C. 154(b) by 4 days.

(21) Appl. No.: 09/850,701

(22) Filed: May 8, 2001

(51) Int. Cl.⁷ ............................................. H01F 27/30
(52) U.S. Cl. ...................... 336/208; 336/198; 336/110
(58) Field of Search ............................ 336/208, 232, 336/223, 198, 192, 210, 110

(56) References Cited

U.S. PATENT DOCUMENTS

| | | |
|---|---|---|
| 2,151,213 A | 3/1939 | Kelley |
| 2,449,438 A | 9/1948 | Wisegarver |
| 3,609,610 A | 9/1971 | Flentge |
| 4,067,541 A | 1/1978 | Hunter |
| 4,228,415 A | 10/1980 | Schantz |
| 5,364,067 A | 11/1994 | Linkner, Jr. |
| 5,439,279 A | 8/1995 | Linkner, Jr. et al. |
| 5,449,227 A | 9/1995 | Steinberg et al. |
| 5,494,255 A | 2/1996 | Pearson et al. ........ 251/129.15 |
| 5,513,905 A | 5/1996 | Zeides et al. |
| 5,683,151 A | 11/1997 | Friedow et al. |
| 5,895,026 A | 4/1999 | Linkner, Jr. et al. |
| 5,921,526 A | * 7/1999 | Najmolhoda ................ 251/65 |
| 6,120,114 A | * 9/2000 | Blazic et al. ............ 303/119.2 |
| 6,302,499 B1 | * 10/2001 | Linkner, Jr. et al. ..... 303/119.2 |
| 6,362,717 B1 | * 3/2002 | Lewin ........................ 336/210 |

FOREIGN PATENT DOCUMENTS

| | | |
|---|---|---|
| DE | 100 31 231 A | 5/2001 |
| EP | 0 452 173 A1 | 10/1991 |
| EP | 0 791 939 A | 8/1997 |
| EP | 0 866 649 A | 9/1998 |
| GB | 616777 | 1/1949 |
| GB | 675855 | 7/1952 |
| JP | 2001 068335 A | 3/2001 |
| RU | 464747 | 3/1975 |
| WO | WO 97 33287 A | 9/1997 |

* cited by examiner

*Primary Examiner*—Anh Mai
(74) *Attorney, Agent, or Firm*—MacMillan, Sobanski & Todd, LLC

(57) ABSTRACT

A coil assembly for a solenoid valve includes a bobbin formed from an electrically insulative material. A bore extends axially through the bobbin. A first flux ring having a sleeve extending axially from an annular base is mounted upon a first end of the bobbin with the sleeve extending into the bobbin bore. Similarly, a second flux ring also having a sleeve extending from an annular base is mounted upon a second end of the bobbin that is opposite from the first flux ring with its sleeve extending into the bobbin bore. The flux rings are formed from a magnetically permeable material that has a high heat conductivity. Magnet wire is wound upon the assembled bobbin and flux rings to form the coil assembly.

22 Claims, 9 Drawing Sheets

SOLENOID VALVE COIL HAVING AN INTEGRATED BOBBIN AND FLUX RING ASSEMBLY

BACKGROUND OF THE INVENTION

This invention relates in general to solenoid valves for electronic brake control systems and in particular to a solenoid valve coil wound upon an integrated bobbin and flux ring assembly.

An Electronic Brake Control System (EBCS) is often included as standard equipment on new vehicles. When actuated, the EBCS is operative to modulate the pressure applied to the vehicle wheel brakes. A typical EBCS includes a plurality of solenoid valves mounted within a control valve body and connected to the vehicle hydraulic brake system between the brake master cylinder and the individual wheel brake cylinders. The solenoid valves usually are normally open, or isolation, valves and normally closed, or dump, valves. Proportional solenoid valves also can be included. The valve body further includes one or more accumulators for the temporary storage of brake fluid during an operating cycle of the EBCS.

A separate hydraulic source, such as a motor driven pump, is usually included in the EBCS. The pump supplies pressurized brake fluid for reapplying the controlled wheel brakes during an EBCS operational cycle. The pump is typically included within the control valve body while the pump motor is mounted upon the exterior of the control valve body. The pump motor is usually a direct current motor which operates from the vehicle power supply. Typically, the motor runs continuously during an EBCS braking cycle.

An EBCS further includes an electronic control module which has a microprocessor. The microprocessor is electrically connected to the pump motor, a plurality of solenoid coils associated with the solenoid valves, and wheel speed sensors for monitoring the speed and deceleration of the vehicle wheels. The microprocessor also is typically electrically connected to the brake light switch and receives a signal from the switch when the vehicle brakes are applied. Additionally, the EBCS may include one or more accelerometers which also are connected to the microprocessor. The microprocessor includes a memory portion which stores control algorithms for each mode of operation of the EBCS. The control algorithms comprise a set of instructions for the microprocessor which control the operation of the EBCS. The control module is usually mounted upon the valve body. The assembled valve body, motor and control module form a compact unit which is often referred to as an electrohydraulic control unit.

During vehicle operation, the microprocessor in the EBCS control module continuously receives speed signals from the wheel speed sensors. Depending upon the received signals, the microprocessor can select one of several modes for operation of the EBCS. For example, if the microprocessor detects a potential wheel lock-up condition while the vehicle brakes are applied, the microprocessor will select an Anti-Lock Brake System (ABS) mode of operation and activate an ABS braking cycle. During an ABS braking cycle, the microprocessor actuates the pump motor and selectively operates the solenoid valves in the control valve to cyclically relieve and reapply hydraulic pressure to the wheel brakes. The hydraulic pressure applied to the wheel brakes is adjusted by the operation of the solenoid valves to limit wheel slippage to a safe level while continuing to produce adequate brake torque to decelerate the vehicle as desired by the vehicle operator.

Another mode of operation provides Traction Control (TC). If the microprocessors detect excessive slip of a driven wheel when the wheel brakes are not applied, the EBCS will apply the brakes to the slipping wheel and thereby transfer more engine torque to the non-slipping wheel.

The EBCS can also include Vehicle Stability Control (VSC) mode of operation. The VSC mode is entered when the microprocessor detects a potential loss of directional control, such as, for example, a spin-out of the vehicle. In the VSC mode of operation, selected wheel brakes are applied to restore directional control of the vehicle.

Referring now to FIG. 1, there is shown a partial sectional view of a typical EBCS solenoid valve 10 mounted upon an EBCS control valve body 11. The control valve body includes a plurality of internal passages (not shown) that communicate with the valve 10. The valve 10 is a digital valve, that is, it is either open or closed. The particular valve 10 shown in FIG. 1 is a normally open valve, however, the following discussion also applies to normally closed valves. The valve 10 includes an axially shiftable armature (not shown) which is biased in an upward direction by a spring (not shown) such that a ball valve (not shown) is maintained in a normally open position. The ball valve cooperates with a valve seat member 15 which is mounted in the valve body 11. The armature and ball valve are slideably disposed within a valve sleeve 16 having a closed end.

A solenoid coil 20 is carried by the valve sleeve 16 and surrounds the armature 12. The coil 20 is enclosed by a cup shaped metal flux casing 21. The valve sleeve 16 extends through an aperture 22 formed in the upper end of the flux casing 21. An annular flux ring 23 is disposed in the open lower end of the flux casing 21. The flux casing 21 and flux ring 23 complete a magnetic flux path which passes through the armature and the valve seat member 15.

The solenoid coil 20 is of conventional design, comprising a winding 24 formed from multiple turns of an insulated magnet wire having a round cross section, such as #28 ½ magnet wire. The magnet wire is helically wound upon a plastic bobbin 26. The bobbin 26 has a cylindrical center portion 28 that terminates in upper and lower flanges, 30 and 32, respectively. A pair of terminal pin supports 34 extend in an axial direction from the top of the bobbin 26. Each of the supports 34 is molded over a terminal pin 36. An end 38 of the coil winding wire is wound around the base of each of the terminal pins 36 and soldered thereto. The pins 36 are electrically coupled to via a printed circuit board (not shown) to the EBCS microprocessor.

When it is necessary to actuate the valve 10 during an anti-lock braking cycle, an electric current is supplied through the terminal pins 36 to the solenoid coil 20. The current establishes a magnetic field in the armature which pulls the armature in a downward direction, closing the ball valve. When the current is interrupted, the magnetic field collapses, allowing the spring to return the armature to its original position, thereby reopening the ball valve. An EBCS control unit also typically includes other digital solenoid valves, such as normally closed solenoid valves (not shown), which have structures similar to the normally open valve 10 described above. Additionally, an EBCS control unit can include proportional solenoid valves.

SUMMARY OF THE INVENTION

This invention relates to a solenoid valve coil wound upon an integrated bobbin and flux ring assembly.

For electronic brake control systems being currently developed, vehicular solenoid valves can be energized for long periods of time. The energized coils generate heat that must be conducted away from the coils to avoid overheating. Conventional coil bobbins typically have air gaps and low-pressure contacts between the bobbins and the metal parts of the other components of the control system. Accordingly, current units have poor heat conduction properties. Therefore, a coil assembly having improved heat conduction properties would be desirable.

The present invention contemplates a bobbin assembly for a solenoid valve coil that includes a bobbin formed from an electrically insulative material with a bore extending axially therethrough. The bobbin assembly further includes a flux ring formed from a magnetically permeable material having a high heat conductivity. The flux ring has an annular base portion and a tubular sleeve extending axially into an end of the bobbin bore. The bobbin has a pair of flanges formed upon the ends thereof. A winding is wound upon the bobbin between said flanges.

The bobbin assembly can include a second flux ring that also is formed from a magnetically permeable material having a high heat conductivity. The second flux ring has an annular base portion and a tubular sleeve extending into an end of the bobbin bore opposite from the other flux ring.

The bobbin can include an annular ring formed upon an inner surface of the bore and spaced from the ends of the bore. The annular ring forms a stepped bore within the sleeve with the steps positioning at least one of the first and second flux rings within the bore. Alternately, the bobbin can include an least one axially extending rib formed upon an inner surface of the bore and spaced from the ends of the bore. The rib positions at least one of the first and second flux rings within the bore.

The invention further contemplates that the coil and flux rings are received within a flux casing with at least one of the flux rings secured to the flux casing. In the preferred embodiment, the flux rings are pressed into the ends of the flux casing to retain the coil and flux rings within the flux casing.

The invention also contemplates a method for fabricating a solenoid coil assembly that includes forming a bobbin having a generally tubular shape with an axial bore extending therethrough. A flux ring having a sleeve portion extending axially from an annular base portion is provided and the sleeve portion of the flux ring is pressed into an end of the bobbin bore. A coil is then wound upon the bobbin to form a coil assembly. The coil assembly is inserted into a flux casing and the flux casing is secured to the coil assembly. The invention further contemplates that the step of mounting a flux ring upon the bobbin center portion also can include providing a second flux ring having a sleeve portion extending axially from an annular base portion and pressing the sleeve portion of the flux ring into the end of the bobbin bore that is opposite from the first flux ring.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
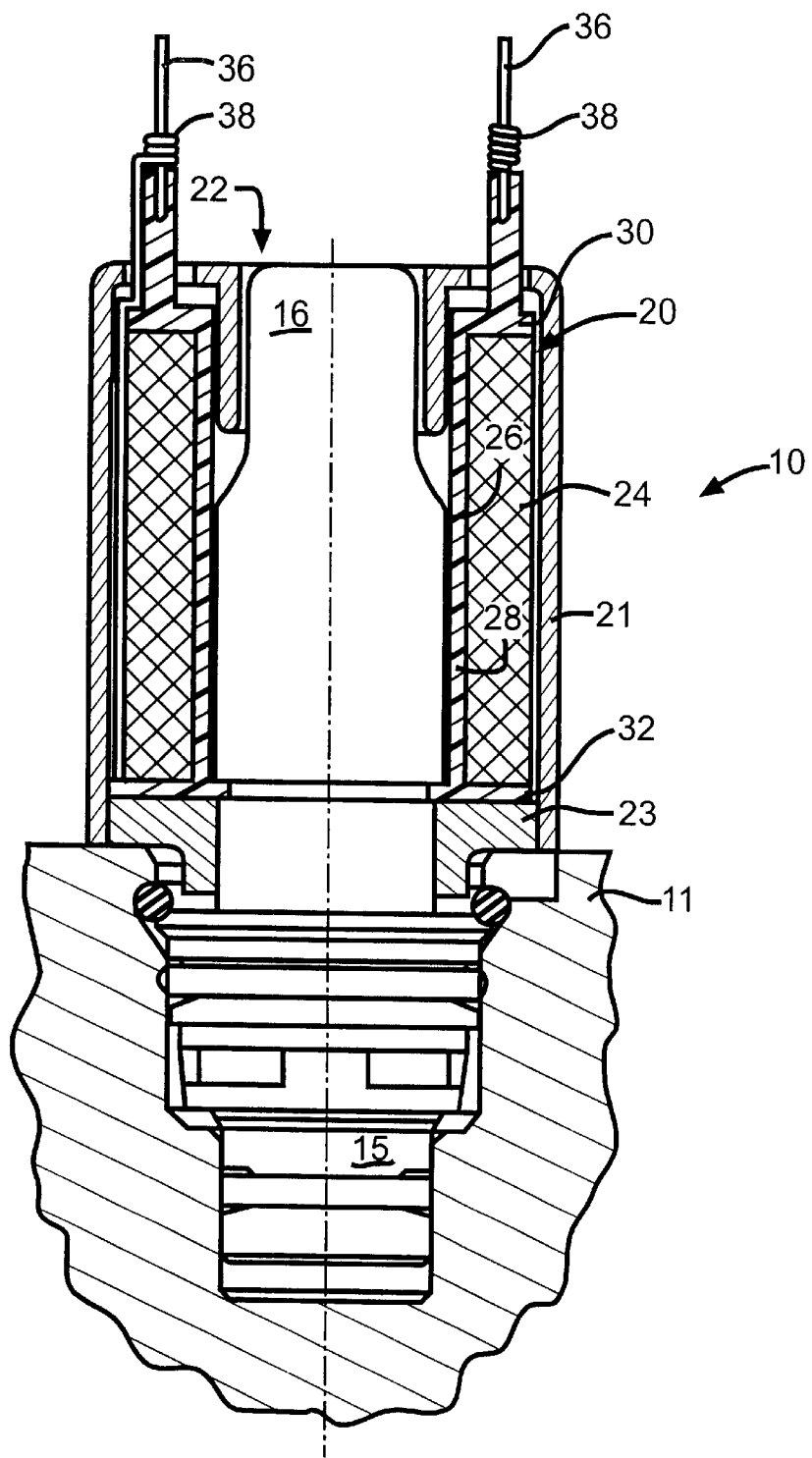
FIG. 1 is partial sectional view of a prior art EBCS solenoid valve.
Figure 2:
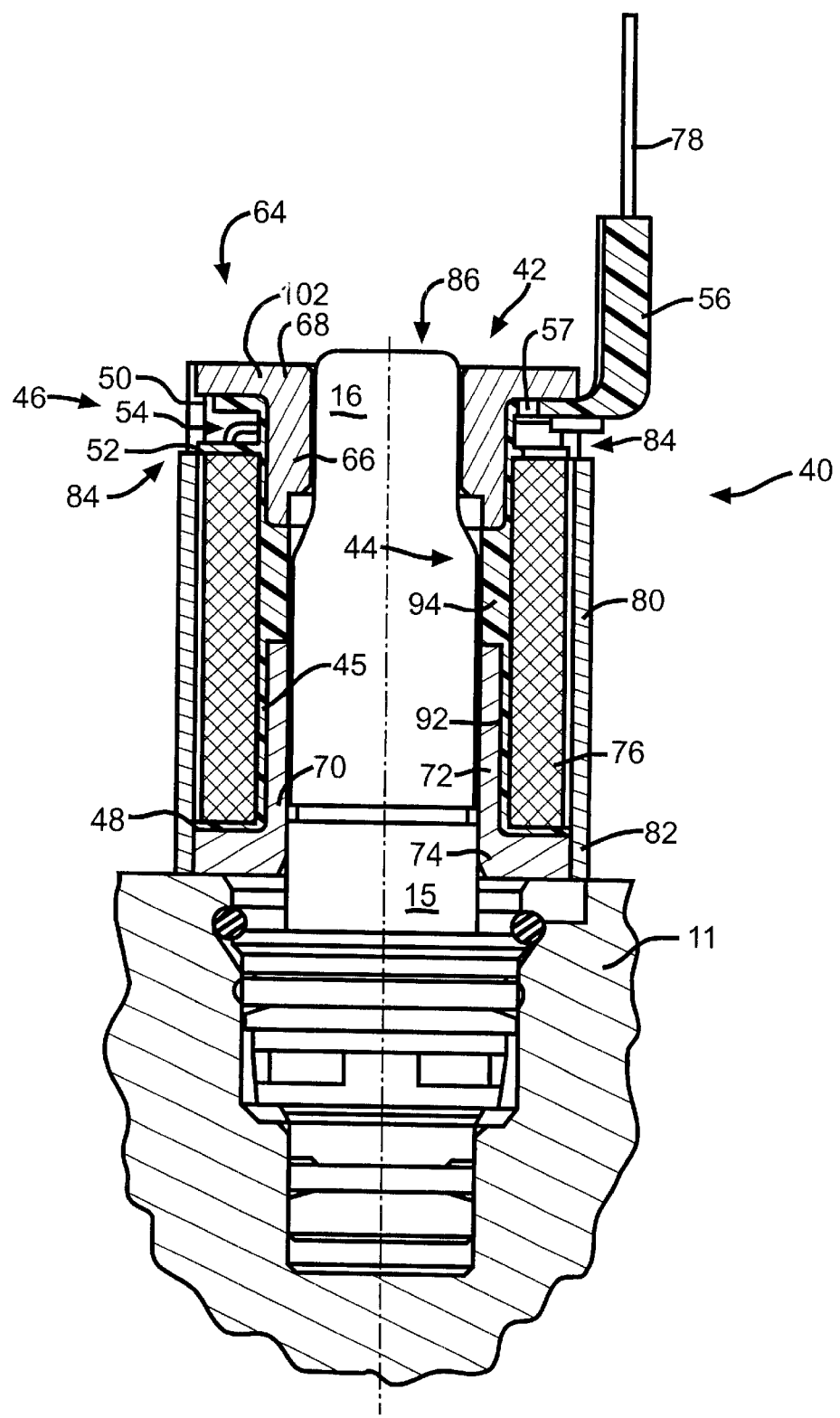
FIG. 2 is a partial sectional view of an EBCS solenoid valve in accordance with the invention.

Referring again to the drawings, there is illustrated in FIG. 2 a partial sectional view of an improved normally open proportional solenoid valve 40 for an electronic brake control system that is in accordance with the invention. Components in FIG. 2 that are similar to components shown in FIG. 1 have the same numerical identifiers. Also, for clarity, the components of the valve 40 disposed within the valve sleeve 16 are not shown in FIG. 2. The valve 40 includes an improved three piece bobbin assembly 42 that has a center bobbin 44 molded from an electrically insulative material, such as a plastic. The bobbin 44 has a tubular center portion 45 with a double upper flange 46 and a lower flange 48 extending in an outward radial direction from the ends thereof.

Figure 3:
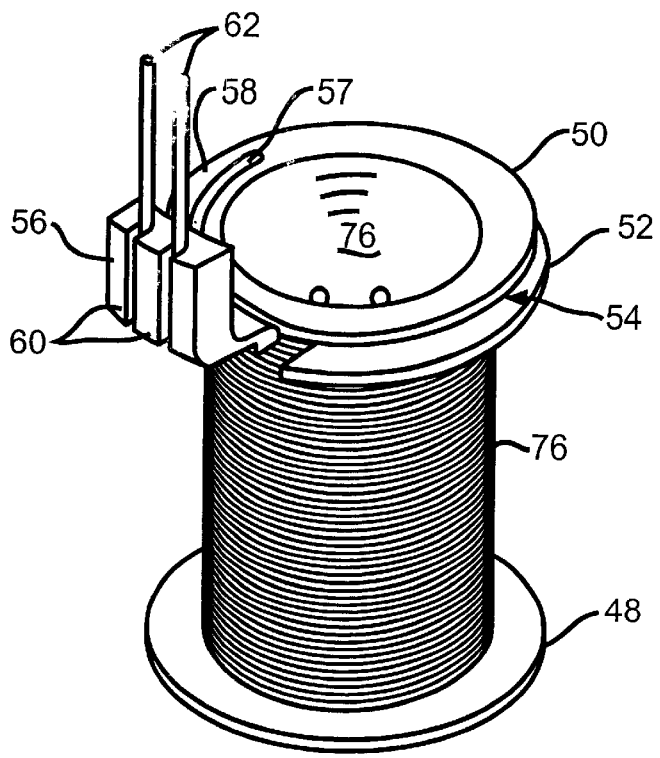
FIG. 3 is an isometric view of the solenoid coil included in the valve shown in FIG. 2.

The upper flange 46 includes a first flange 50 that is axially separated from a second flange 52. The first and second flanges 50 and 52 define a circumferential channel 54 therebetween. Additionally, a coil lead tower 56 is formed upon the circumference of the first flange 50 and extends in an upward axial direction in FIG. 2. As best seen in FIG. 3, an arcuate slot 57 is formed in the first flange 50. The slot 57 extends from the lower end of lead tower 56 and separates the lead tower 56 from the remainder of the bobbin 44 while forming an arcuate leaf spring 58. While the slot 57 is shown as extending through an arc of approximately 90 degrees in FIG. 3, it will be appreciated that the slot 57 also can extend through an arc that is greater or less than 90 degrees. The resilient nature of the plastic forming the bobbin 44 permits the leaf spring 58 to flex and thus allows movement of the lead tower 56 in an axial direction. The movement of the lead tower 56 accommodates stack up tolerances during assembly of electronic control units. As also best seen in FIG. 3, a pair of axial slots 60 are formed in the coil lead tower 56.

While a single lead tower 56 is shown in FIG. 3, it will be appreciated that the invention also can be practiced with a pair of lead towers (not shown) spaced apart upon the circumference of the first flange 50. Additionally, a second arcuate slot (not shown) would be formed in the first flange 50 to define a second leaf spring (not shown). The second tower would extend from the end of the second leaf spring and be movable in an axial direction to accommodate tolerance stack up.

Figures 4, 5:
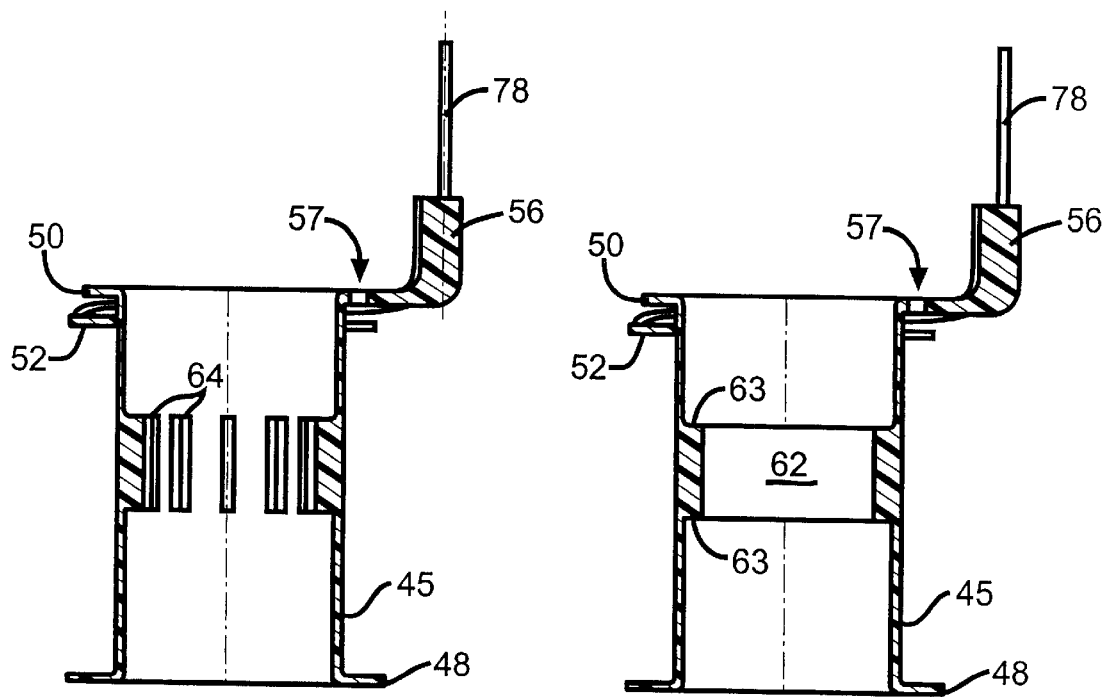
FIG. 4 is a cross-sectional view of the bobbin included in the valve shown in FIG. 2.
FIG. 5 is a cross-sectional view of an alternate embodiment of the bobbin included in the valve shown in FIG. 2.

The bobbin 44 also includes a plurality of radially extending ribs 61 formed upon the inside surface of the bobbin center portion 45, as best seen in FIG. 4. Alternately, the bobbin 44 can include a thickened annular portion 62 formed upon its inner surface, as shown in FIG. 5. The thickened portion 62 forms a pair of annular steps 63A and 63B within the bobbin center portion 45.

The bobbin assembly 42 also includes an upper flux ring 64 that has a sleeve 66 extending in a downward axial direction in FIG. 2 from an annular base portion 68. The upper flux ring 64 is formed from a material having a high heat conductivity and a high magnetic permeability. In the preferred embodiment, the upper flux ring 64 is formed from AISI 1215 steel. The flux ring sleeve 66 is pressed into the upper end of the bobbin center portion 45 and surrounds the upper end of the valve sleeve 16. The sleeve 66 has a bore 69 formed therethrough that has an inside diameter to match the corresponding valve sleeve 16 that extends into the bore 69 upon assembly. Additionally, as illustrated in FIG. 2, the flux ring bore 69 can be stepped to match the shape of flux ring sleeve 16 to reduce any air gap between the flux ring 64 and the valve sleeve 16.

The three piece bobbin assembly 42 also includes a lower flux ring 70. Similar to the upper flux ring 64, the lower flux ring 70 that has a sleeve 72 extending in an upward axial direction in FIG. 2 from an annular base portion 74. The lower flux ring 70 also is formed from a material having a high heat conductivity and a high magnetic permeability. In the preferred embodiment, the lower flux ring 70 is formed from AISI 1215 steel. The sleeve 74 is pressed into the lower end of the bobbin center portion 45. Similar to the upper flux ring sleeve 66, the lower flux ring sleeve 72 has an inside diameter that is selected to minimize any air gaps between the flux ring 70 and the valve sleeve 16.

The upper and lower flux ring sleeves 66 and 72 co-operate with the ribs 61 to position the flux rings 64 and 70 with respect to the bobbin 44. However, in the preferred embodiment, the ribs 61 position the upper flux ring 64 while the lower flux ring 70 is positioned by the bobbin lower flange 48. The flux ring positioning provides a first small axial gap between the upper flux ring base portion 68 and the bobbin first flange 50 and a second small axial gap between the upper end of the lower flux ring sleeve 72 and the lower ends of the ribs 61, as illustrated in FIG. 2. The small axial air gaps accommodate stack up tolerances of valve components. Alternately, the thickened annular portion 62 formed upon the inner surface of the bobbin 44 and the corresponding pair of annular steps 63A and 63B can axially position the upper and lower flux rings 64 and 70 within the bore 68.

As shown in FIG. 2, magnet wire is wound about the bobbin 44 between the flanges 52 and 48 to form a winding 76. A pair of coil leads 78 extend from the winding 76 and through the channel 56. The coil leads 78 are received in the lead tower slots 58 and extend in an upward axial direction from the upper end of the lead tower 56.

The bobbin assembly 42 is disposed within a tubular flux casing 80 that is also formed from a material having a high heat conductivity, such as, for example, Steel AISI 1215. As shown in FIG. 2, the lower end 82 of the flux casing 80 has a reduced diameter. In the preferred embodiment, the lower flux ring base 74 has the same diameter as the bobbin lower flange 48 while the upper flux ring base 68 has a greater diameter. Accordingly, the bobbin assembly 42 can be easily inserted into the flux sleeve 80 and then the lower flux ring base 74 is pressed into the lower end 82 of the flux sleeve 80 while the upper flux ring base 68 is pressed into the upper end of the flux sleeve 80 to retain the bobbin assembly 42 within the sleeve 80. It will be appreciated that the flux casing 80 also can be attached to the bobbin assembly 42 by other conventional methods, such as crimping, spot welding or an adhesive bond. The upper end of the flux casing 80 includes a plurality of axial slits 84 (two shown) formed in its upper end. The coil support towers 56 and the coil leads 78 pass through the slits 84.

The support towers 56 are optional and it will be understood that other conventional structures can be incorporated for coil leads 78. For example, the coil leads 78 could extend axially through apertures or slits formed through the upper flux ring base 68 (not shown) similar in structure to the prior art valve 10 shown in FIG. 1. Additionally, with the coil leads extending through the upper flux ring base 68, a single upper flange could be formed upon the bobbin (not shown) in place of the double flange 46. A bore 86 extends through the bobbin 44 and receives the portion of the solenoid valve extending from the EBCS control valve body 11.

The lower flux ring 70 contacts the valve body 11, the valve seat member 15 and the valve sleeve 16. Similarly, the upper flux ring sleeve 66 contacts the valve sleeve 16. The contact between the upper and lower flux rings 64 and 70 with the valve components provides a path for heat conduction to the valve body 11 and enhances cooling of the coil 24. Additionally, the outer circumferences of the upper and lower flux ring bases 68 and 74 contact the flux casing 80, providing another path for conducting heat away from the coil 76 and to the flux casing 80. The coil winding stresses on prior art bobbins require that the bobbins have a typical thickness of 1.00 mm. Because the improved bobbin assembly 42 has steel flux ring sleeves 66 and 72 reinforcing the bobbin center portion 45, the center portion 45 can have a much thinner wall, perhaps as thin as 0.20 mm. The thinner wall further improves heat conduction away from the coil 76. The inventors have found, during testing, that the improved bobbin assembly 42 provides significant improvement in heat conduction over prior art bobbins.

Figure 6:
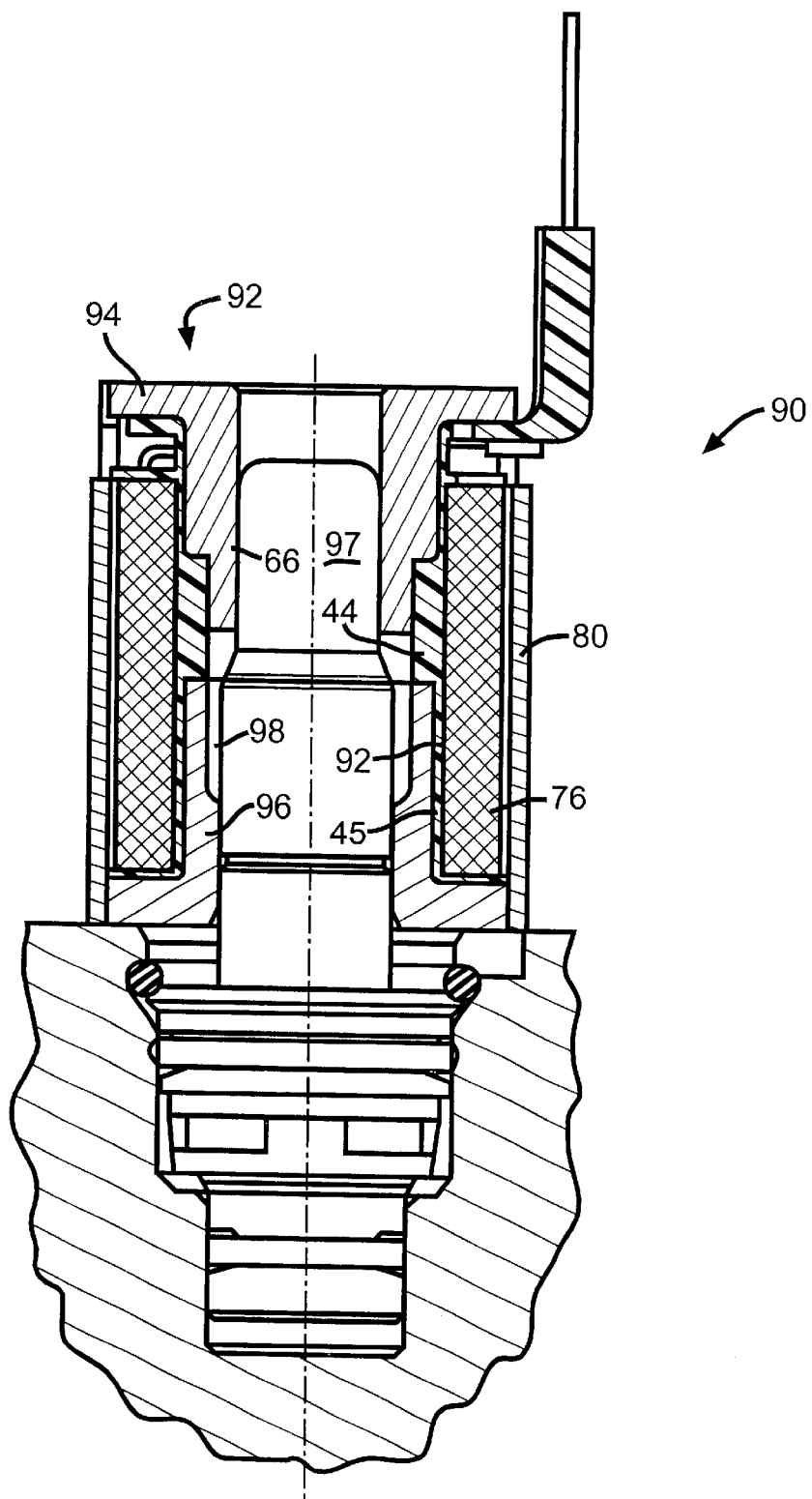
FIG. 6 is a partial sectional view of an alternate embodiment of the valve shown in FIG. 2.

Another alternate embodiment of the invention as applied to a normally open digital valve 90 is illustrated in FIG. 6. As before, components in FIG. 6 that are similar to components shown in the previous figures have the same numerical designators. The valve 90 includes a modified bobbin assembly 92 that includes upper and lower flux rings 94 and 96 that are shaped to accommodate the valve sleeve 97. As shown in FIG. 6, the valve sleeve 97 has a shape that differs from the valve sleeve shapes shown in FIGS. 1 and 2. Accordingly, the inside diameters and the lengths of the sleeves of the flux rings 94 and 96 are selected to provide close magnetic coupling with the valve sleeve 97 and the valve armature (not shown) that is contained within the sleeve 97. Additionally, the lower flux ring 96 includes an annular recess 98 formed in the upper end of the sleeve bore that concentrates the flux at the lower end of the valve sleeve 97 adjacent to the valve armature (not shown). However, the bobbin assembly 92 utilizes the same bobbin 44 and winding 76 as described above for the valve 40 shown in FIG. 2. Similarly, the same flux casing 80 as described above is used with the valve 90. Thus, the number of component variations is reduced and the manufacturing of the valve is significantly simplified with associated time and cost savings.

Figure 7:
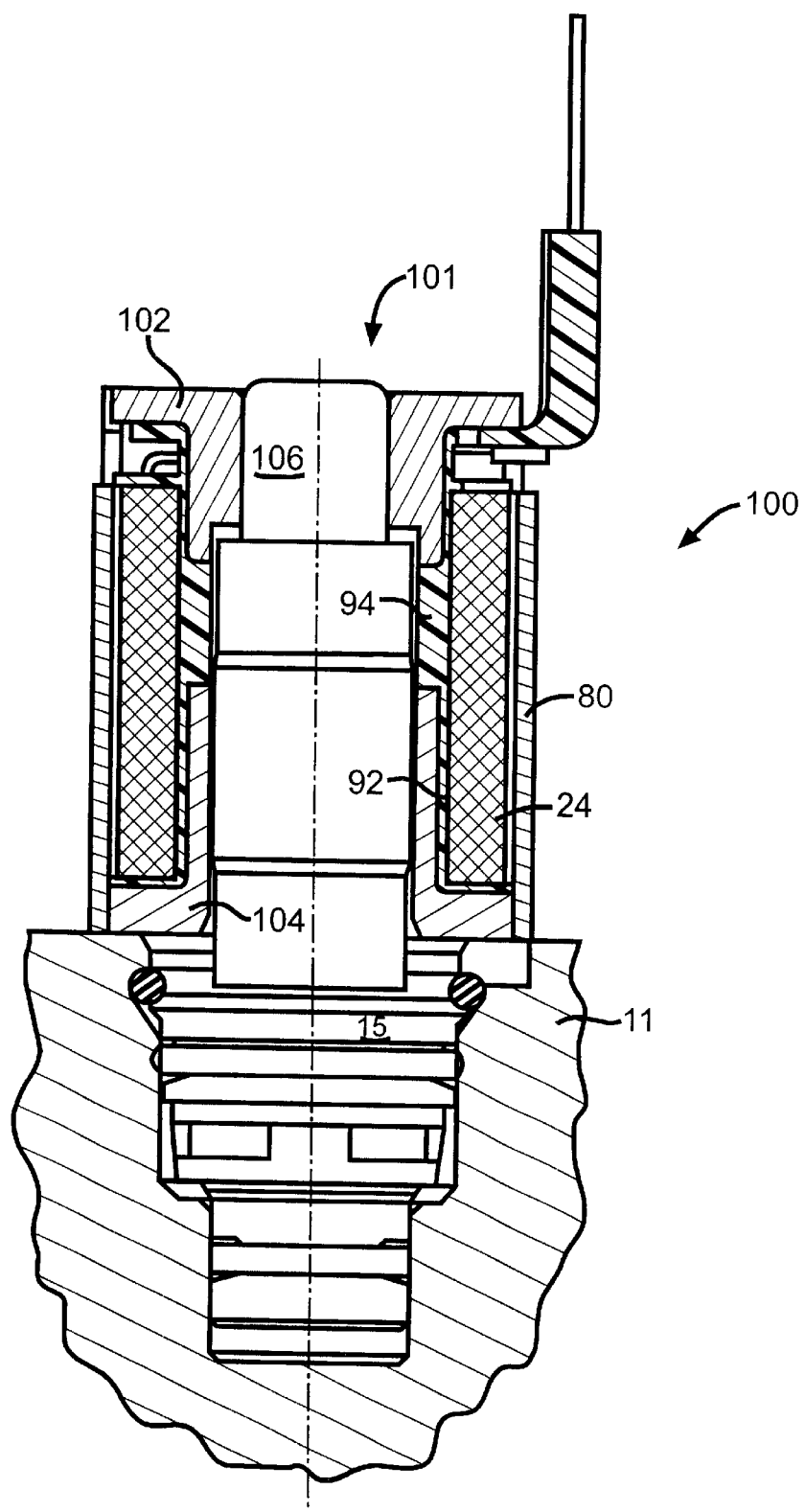
FIG. 7 is a partial sectional view of another alternate embodiment of the valve shown in FIG. 2.

Similarly, another alternate embodiment of the invention as applied to a normally closed proportional solenoid valve 100 is illustrated in FIG. 7. As before, components in FIG. 7 that are similar to components shown in the previous FIGS. have the same numerical designators. Similar to the valve 90 described above, the valve 100 includes a modified bobbin assembly 101 having upper and lower flux rings 102 and 104 that are shaped to accommodate the valve sleeve 106 and the valve armature (not shown) that is contained within the sleeve. Again, the same bobbin 44 and winding 76 are used. Also the flux casing 80 is identical the that used on the valves 40 and 90 described above. Therefore, the manufacturing of the valve is significantly simplified with associated time and cost savings.

Figure 8:
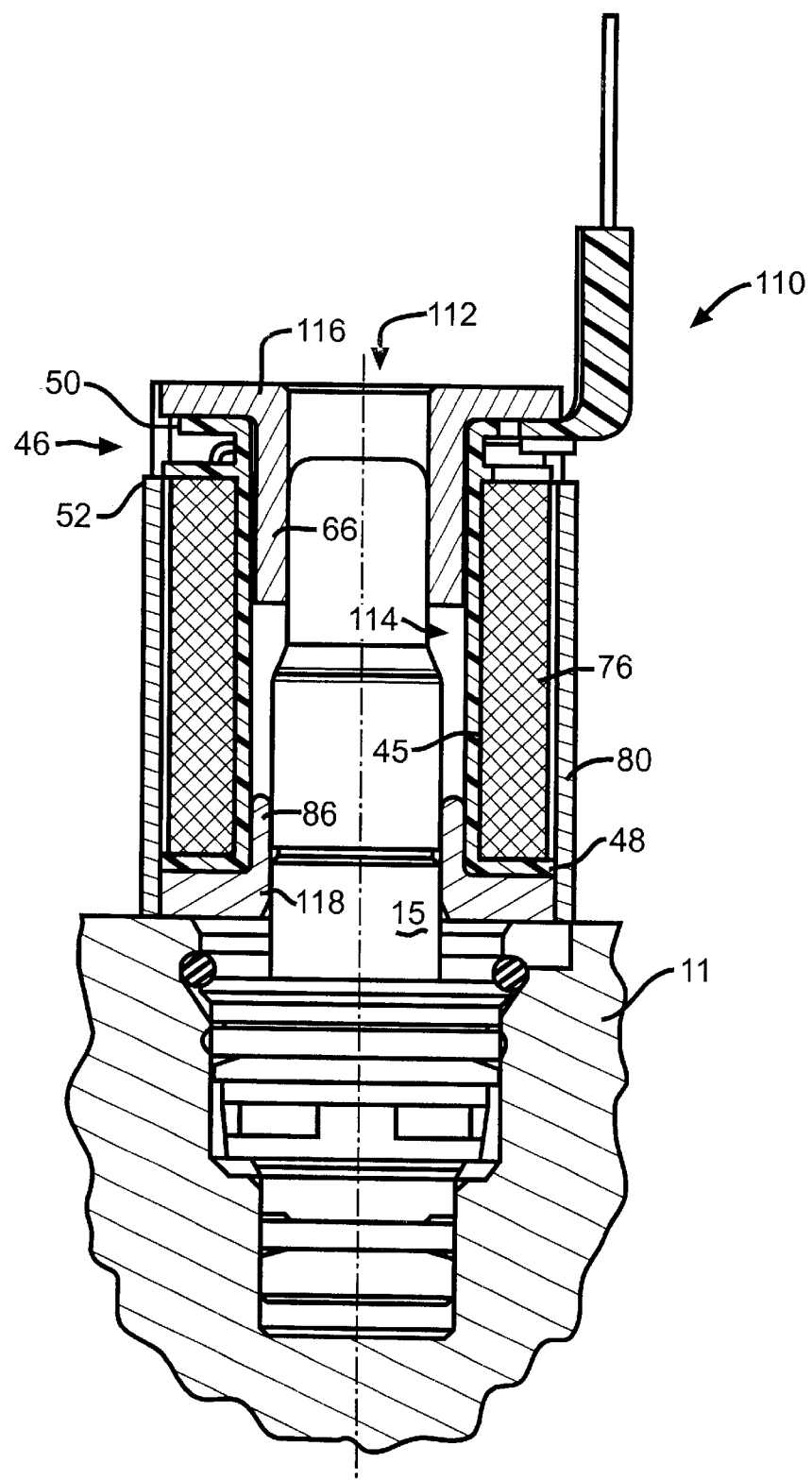
FIG. 8 is a partial sectional view of another alternate embodiment of the valve shown in FIG. 2.

Another alternate embodiment of the invention is illustrated in FIG. 8, where another normally open digital valve 110 is illustrated. As before, components in FIG. 87 that are similar to components shown in the previous figures have the same numerical designators. The valve 110 has a modified bobbin assembly 112 that includes a bobbin 114 that does not have internal spacing ribs or a stepped bore as described for the preceding valves 40, 90 and 100. Accordingly, the upper flux ring 116 is positioned relative to the bobbin 114 by the first bobbin flange 50. Additionally, the upper and lower flux rings 116 and 118 have different shapes and the lower flux ring sleeve does not extend as far into the bobbin bore as shown above in FIG. 6. Because the lower flux ring sleeve supports less of the bobbin bore, the wall of the bobbin bore is thicker than the wall of the bobbin 45 utilized in the preceding embodiments of the invention. However, the flux casing 80 described above is again utilized with the valve 110.

For the valve 110, the bobbin upper and lower flanges, 46 and 48, align the upper and lower flux rings 116 and 118 with respect to axial distance and angular positions as the upper flux ring base bottoms on the first upper bobbin flange 50 and the lower flux ring base bottoms on the lower bobbin flange 48. This is important, especially when the bobbin assembly 82 is installed into lateral-gap proportional valves.

Figure 9:
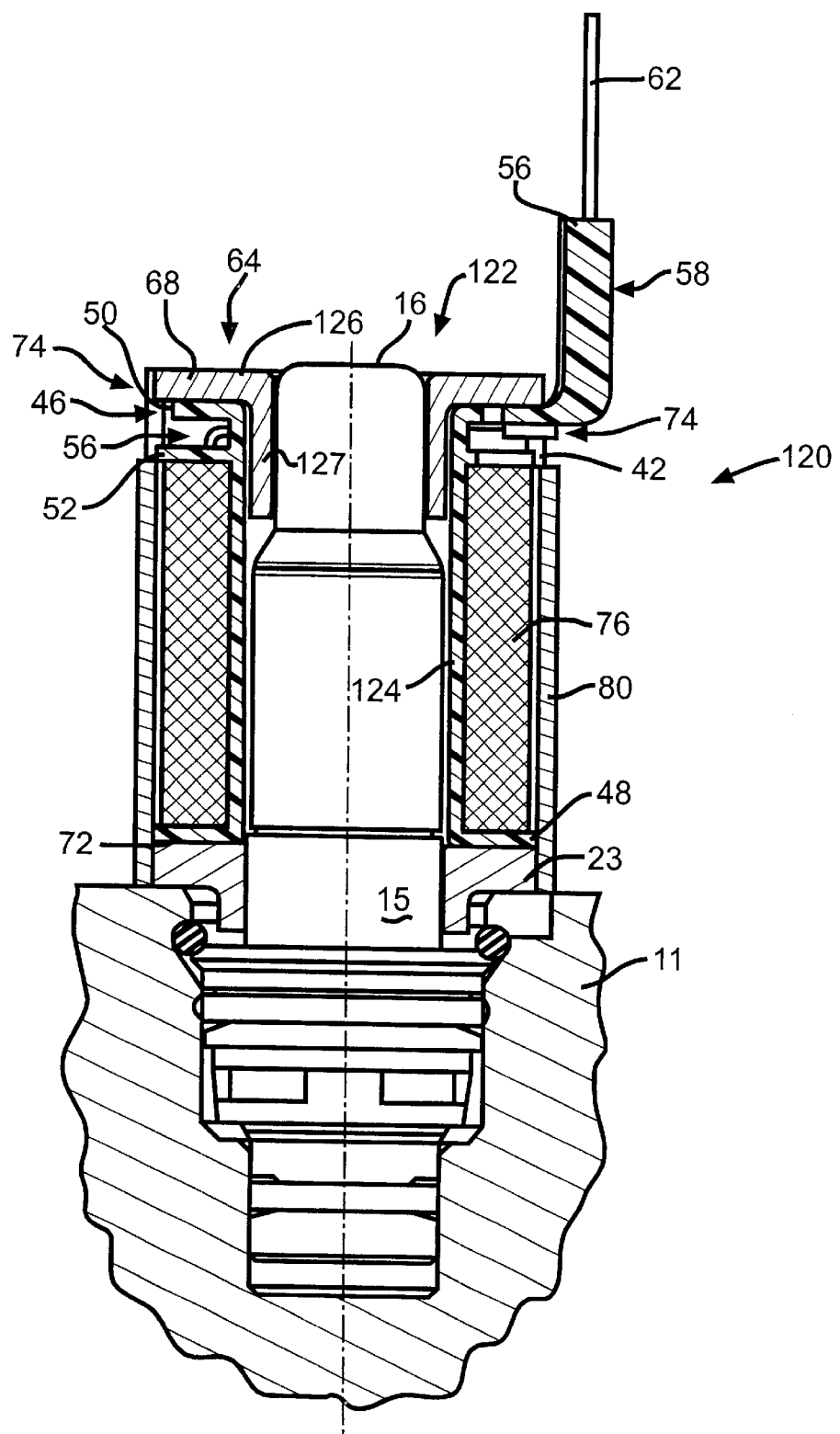
FIG. 9 a partial sectional view of another alternate embodiment of the valve shown in FIG. 2.

Another alternate embodiment of the solenoid valve is shown generally at 120 in FIG. 9. As before, components in FIG. 9 that are similar to components shown in the previous figures have the same numerical designators. The valve 120 has a two piece bobbin assembly 122 that includes bobbin 124 and a single upper flux ring 126 having a downwardly extending sleeve 127 that is pressed into the bobbin bore as described above. A coil 76 is wound upon the bobbin 124 and the resulting bobbin assembly 122 is pressed into the flux casing 80. A conventional flux ring 23 is then pressed into the open lower end of the flux casing 80. Similar to the coil assembly 112 shown in FIG. 8, the wall of the bobbin bore is thicker than the wall of the bobbin 45 utilized in the earlier illustrated embodiments of the invention.

Figure 10:
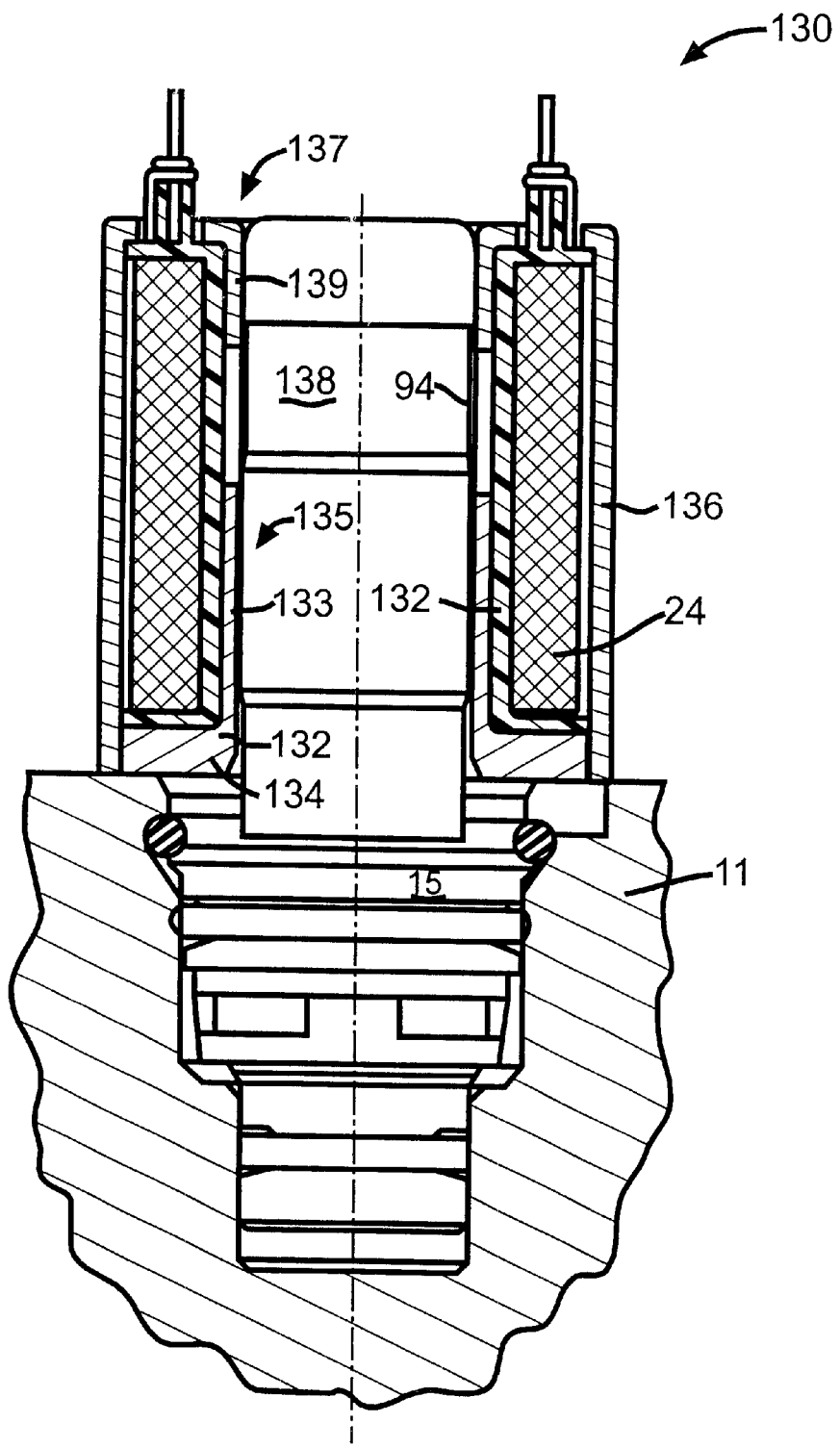
FIG. 10 a partial sectional view of another alternate embodiment of the valve shown in FIG. 2.

Another embodiment of a valve having a two piece coil assembly is shown generally at 130 in FIG. 10. Again, components shown in FIG. 10 that are similar to components shown in previous figures have the same numerical designators. The valve 130 includes a bobbin 132 molded from an electrically insulative material, such as plastic. The bobbin 132 has a generally tubular shape with a pair a flanges extending in a radial outward direction from the ends. A single flux ring 132 is pressed into the lower end of the bobbin bore. As before, the flux ring 132 is formed from a material having a high heat conductivity and a high magnetic permeability, such as, for example ANSI 1215 steel and includes an a sleeve 133 extending in an upward axial direction from an annular base 134. Magnet wire is wound about the bobbin 134 between the flanges to form the coil 24. The bobbin 132 with winding 24 and the flux ring 132 form a two piece coil assembly 135.

The valve 130 also includes a generally cup-shaped flux casing 136 having an open end that receives the coil two piece assembly 135. As shown in FIG. 10, the flux casing 136 has a central aperture 137 formed through the end opposite from the open end. The central aperture 137 receives the upper end of the valve sleeve 138; however, it will be appreciated that the flux casing 136 can have other shapes than that shown in FIG. 10. Also, the upper end of the flux casing 136 includes a portion 139 that extends axially into the upper end of the bobbin bore to position the bobbin 132 relative to the upper end of the valve sleeve 138. The lower end of the flux casing 136 is secured to the circumference of the flux ring base 134 by a conventional method, such as, for example, crimping, spot welding, press fitting or adhesive bonding. As before, the flux ring sleeve 133 and the base 134 provide a conduction path for heat from the coil 24 to the valve body 11 and the flux casing 136 where the coil heat can be absorbed and dissipated or radiated.

It will be appreciated that the structure of the coil assembly described above is adaptable to solenoid valve sleeves having different axial lengths and diameters by using different shaped flux rings but the same bobbin and flux casing, as illustrated in FIGS. 6 and 7.

Figure 11:
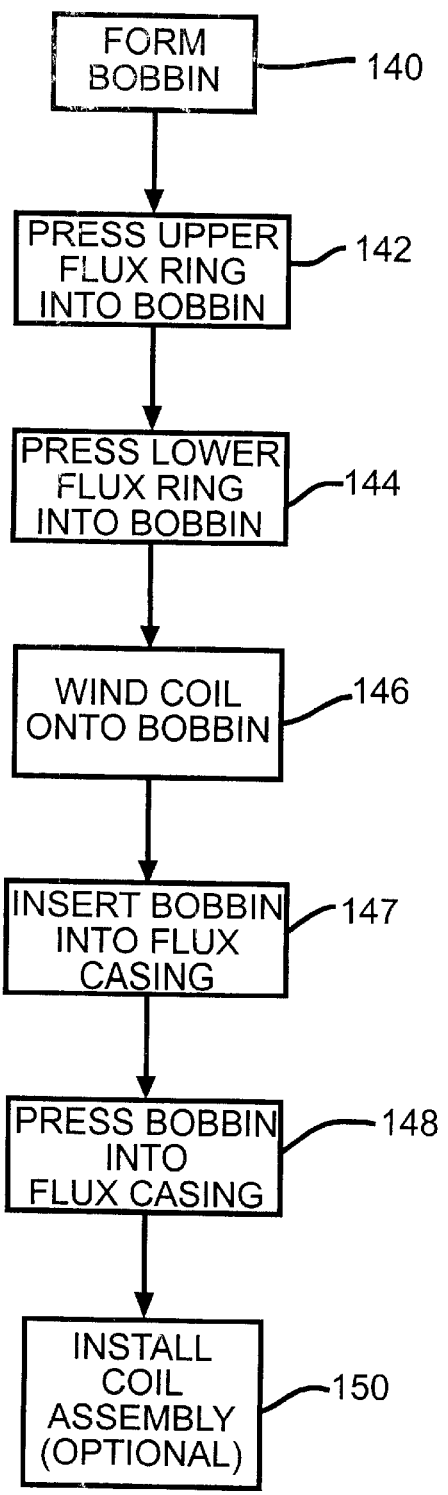
FIG. 11 is a flow chart for assembling the solenoid coil shown in FIG. 2.

The invention also contemplates a method of fabricating the improved bobbin, as illustrated by the flow chart in FIG. 11. In functional block 140 the bobbin is formed by a conventional method, such as injection molding. The upper flux ring sleeve is pressed into the center portion in functional block 142 and the lower flux ring sleeve is pressed into the center portion in functional block 144. The bobbin assembly is placed upon a winding mandrel in functional block 146 and the coil is wound upon the bobbin from magnet wire.

The winding tension of the magnet wire helps retain the sleeves of the flux rings within the bobbin. Additionally, the hoop stress of the windings establishes a high contact stress between the windings and the bobbin center portion and between the bobbin center portion and the flux ring sleeves. The high contact stress provides a much lower thermal resistance path between the coil windings and the flux casing and valve body, where the heat generated by the coil can be absorbed and dissipated. Also, as described above, the steel flux ring sleeves reinforce the bobbin center portion, permitting use of a much thinner wall that further improves heat conduction.

In functional block 147, the bobbin assembly is removed from the winding machine and inserted into a flux casing. In the preferred embodiment, the bobbin assembly is secured within the flux casing by pressing the assembly the rest of the way into the casing in functional block 148. The flux casing can alternately be secured to the bobbin assembly in functional block 148 by other conventional methods, such as crimping, spot welding or adhesive bonding. While the coil assembly is completed in functional block 148, an additional step is shown in functional block 150 where the coil assembly is installed in the electronic brake control system. Typically, the coil leads are electrically connected to a printed circuit board or lead frame carried by a housing that is then attached to the valve body with the coil bores receiving corresponding valve sleeves. Functional block 150 is included for completeness and is not required for fabrication of the improved bobbin.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention has been illustrated and discussed for normally open and closed proportional solenoid valves and a normally open digital solenoid valve, it will be appreciated that the invention also can be practiced for other valves, such as, for example a normally closed digital valve.

What is claimed is:

1. A bobbin assembly for a solenoid valve comprising:
   a bobbin formed from an electrically insulative material, said bobbin having a axial bore formed therethrough; and
   a flux ring formed from a magnetically permeable material having a high heat conductivity, said flux ring having an annular base portion and a tubular sleeve extending axially into an end of said bobbin bore.

2. A bobbin assembly according to claim 1 wherein said bobbin has a pair of flanges formed upon the ends thereof, each of said flanges extending in a radial outward direction from said bobbin.

3. A bobbin assembly according to claim 2 further including a winding wound upon said bobbin between said flanges.

4. A bobbin assembly according to claim 3 wherein said flux ring is a first flux ring and further wherein the bobbin assembly includes a second flux ring formed from a magnetically permeable material having a high heat conductivity, said second flux ring having an annular base portion and a tubular sleeve extending axially into an end of said bobbin bore opposite from said first flux ring.

5. A bobbin assembly according to claim 4 wherein said bobbin bore includes an annular ring formed upon an inner surface thereof, said annular ring being spaced from the ends of said bore, said annular ring forming a stepped bore within said sleeve with said steps positioning at least one of said first and second flux rings within said bore.

6. A bobbin assembly according to claim 4 wherein said bobbin bore includes an least one axially extending rib formed upon an inner surface thereof, said rib being spaced from the ends of said sleeve, said rib positioning at least one of said first and second flux rings within said bore.

7. A bobbin assembly according to claim 4 wherein said bobbin includes a third flange formed upon an end thereof, said third flange spaced axially apart from one of said pair of flanges, said third flange having an arcuate slot formed therein, said arcuate slot defining a spring having a free end, said free end being movable in an axial direction, and further wherein at least one coil lead support tower extends in an axial direction from said free end of said spring whereby said spring allows axial movement of said support tower to accommodate component stack up tolerances.

8. A bobbin assembly according to claim 7 wherein said coil support tower has at least one axial slot formed therein, said axial slot receiving a coil lead wire.

9. A bobbin assembly according to claim 4 wherein said first flux ring has an inside diameter and sleeve length selected to correspond to a particular solenoid valve.

10. A bobbin assembly according to claim 9 wherein said second flux ring also has an inside diameter and sleeve length selected to correspond to said particular solenoid valve.

11. A bobbin assembly according to claim 10 wherein at least one of said flux rings includes an annular recess formed in an inner surface whereby magnetic flix is concentrated in a portion of said bobbin bore.

12. A coil assembly for a solenoid valve comprising:
   a bobbin formed from an electrically insulative material, said bobbin having an axial bore formed therethrough;
   a flux ring formed from a magnetically permeable material having a high heat conductivity, said flux ring having an annular base portion and a tubular sleeve, said tubular sleeve extending axially into an end of said bobbin bore;
   a winding wound upon said bobbin to form a winding assembly; and
   a generally cup-shaped flux casing having an open end, said flux casing receiving said winding assembly and being secured to the circumference of said flux ring.

13. A coil assembly for a solenoid valve comprising:
   a bobbin formed from an electrically insulative material, said bobbin having an axial bore formed therethrough;
   a first flux ring formed from a magnetically permeable material having a high heat conductivity, said flux ring having an annular base portion and a tubular sleeve, said tubular sleeve extending axially into an end of said bobbin bore;
   a second flux ring formed from a magnetically permeable material having a high heat conductivity, said second flux ring having an annular base portion and a tubular sleeve extending axially into an end of said bobbin bore that is opposite from said first flux ring;
   a winding wound upon said bobbin to form a winding assembly; and
   a tubular flux casing, said winding assembly disposed within said flux casing with at least one of said flux rings secured to said flux casing.

14. A coil assembly according to claim 13 wherein said first flux ring has an annular base having a first outside diameter and said second flux ring also has an annular base having a second outside diameter with said second outside diameter being greater than said first outside diameter and further wherein said tubular flux casing has a first and second end with said first end having an inside diameter that is less than the inside diameter of said second end, said winding assembly being inserted into said tubular flux casing with said first flux ring pressed into said first tubular flux casing end and said second flux ring being pressed into said second tubular flux casing end.

15. A coil assembly according to claim 14 wherein said tubular flux casing has a notch formed in an end thereof and further wherein said bobbin includes a flange formed upon an end thereof, said having an arcuate slot formed therein, said arcuate slot defining a spring having a free end, said free end being movable in an axial direction, and further wherein at least one coil lead support tower extends in an axial direction from said free end of said spring and through said flux casing notch whereby said spring allows axial movement of said support tower to accommodate component stack up tolerances.

16. A method for fabricating a solenoid coil comprising the steps of:
   (a) forming a bobbin from an electrically insulative material, the bobbin having an axial bore extending therethrough;
   (b) providing a flux ring formed from a magnetically permeable material that has a high heat conductivity, the flux ring having a sleeve portion extending is axially from an annular base portion, and pressing the flux ring sleeve portion into an end of the bobbin bore;
   (c) winding a coil upon the bobbin to form a coil assembly;
   (d) inserting the coil assembly into a flux casing; and
   (e) securing the flux casing to the coil assembly.

17. The method according to claim 16 wherein the bobbin includes pair of flanges formed upon the ends thereof, each of the flanges extending in a radial outward direction from the bobbin ends and further wherein in step (d) the coil is wound upon the bobbin between the flanges.

18. The method according to claim 17 wherein the flux casing has a generally cup shape with an open end and further wherein in step (d) the coil assembly is inserted into the open end of the flux casing.

19. The method according to claim 17 wherein the flux ring is a first flux ring and step (b) also includes providing a second flux ring formed from a magnetically permeable material that has a high heat conductivity, the second flux ring having a sleeve portion extending axially from an annular base portion, step (b) further including pressing the sleeve portion of the second flux ring into an end of the bobbin bore that is opposite from the first flux ring.

20. The method according to claim 19 wherein the first flux ring has an annular base having a first outside diameter and the second flux ring also has an annular base having a second outside diameter with the second outside diameter being greater than the first outside diameter and the flux casing is a tubular sleeve having open first and second ends with the first end of the sleeve having an inside diameter that is less than the inside diameter of the second end of the sleeve and further wherein in step (e) the flux casing is secured to the coil assembly by pressing the first flux ring base into the first flux tube end and pressing the second flux ring base into the second flux tube end.

21. The method according to claim 20 wherein the bobbin includes an annular ring formed upon an inner surface of the bobbin bore, the annular ring being spaced from the ends of said bobbin bore, the annular ring forming a stepped bore within the bobbin center portion with the steps positioning at least one of the first and second flux rings within the bobbin bore.

22. The method according to claim 20 wherein the bobbin includes an least one axially extending rib formed upon an inner surface of the bobbin bore, the rib being spaced from the ends of the bobbin bore, the rib positioning at least one of the first and second flux rings within the bobbin bore.

* * * * *